May 22, 1934.  W. F. BEASLEY  1,959,337
CHAIN
Filed Feb. 6, 1931  2 Sheets-Sheet 1
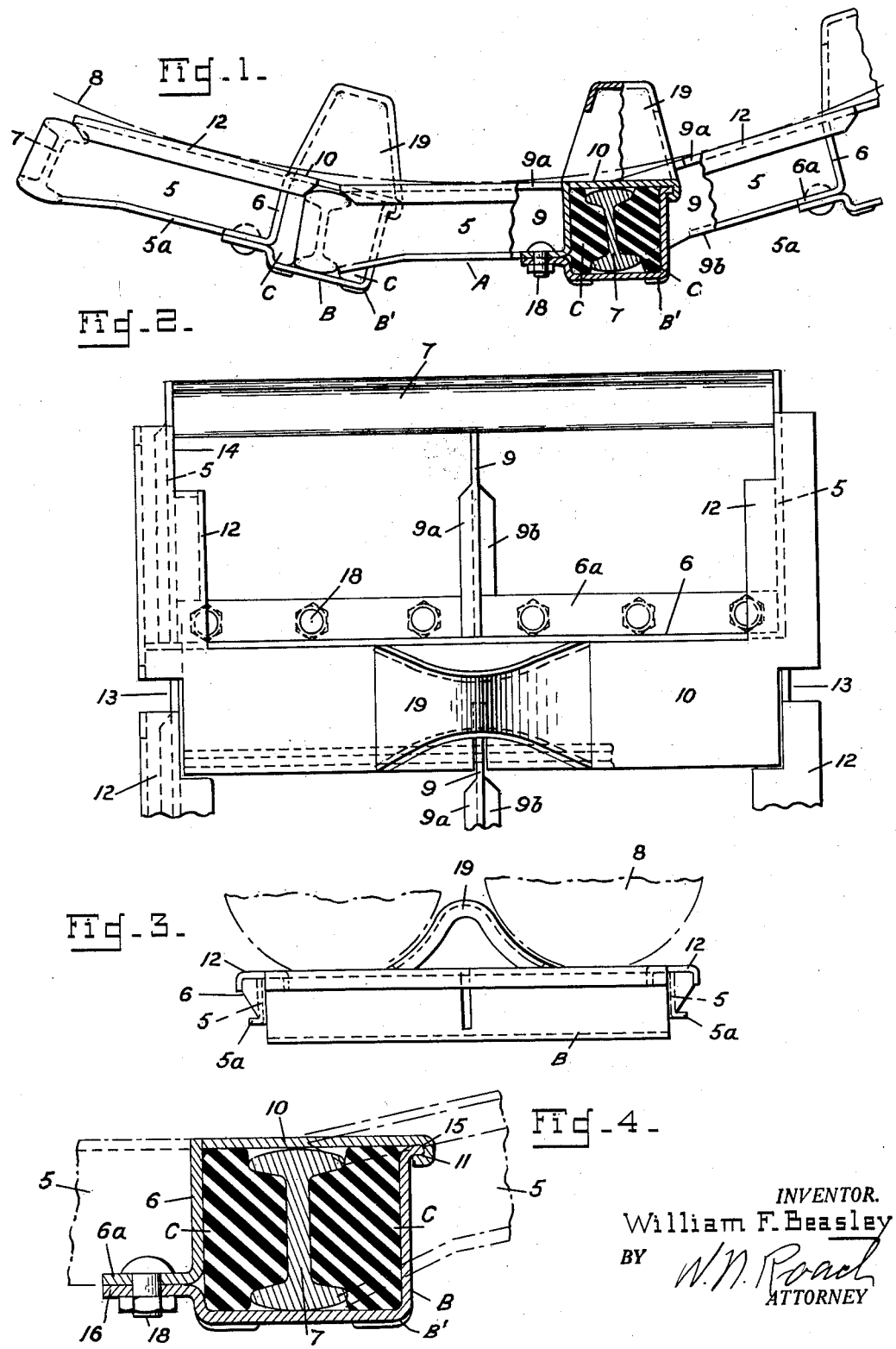
INVENTOR.
William F. Beasley
BY
ATTORNEY May 22, 1934. W. F. BEASLEY 1,959,337
CHAIN
Filed Feb. 6, 1931 2 Sheets-Sheet 2
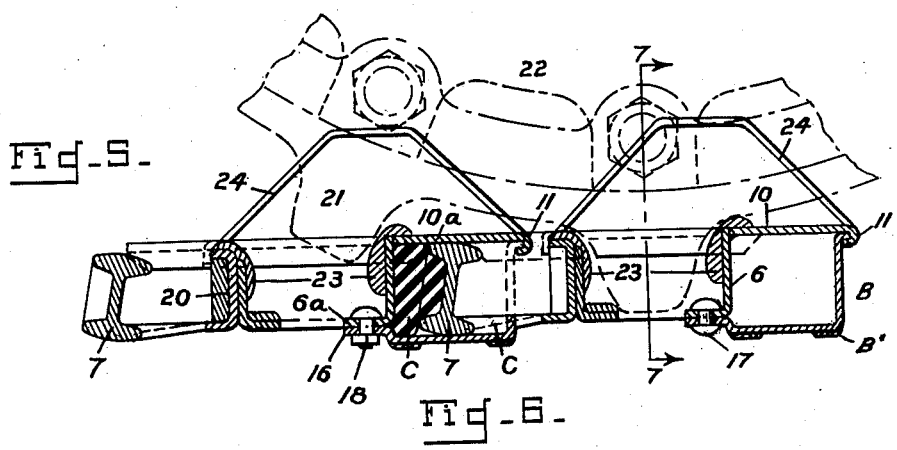
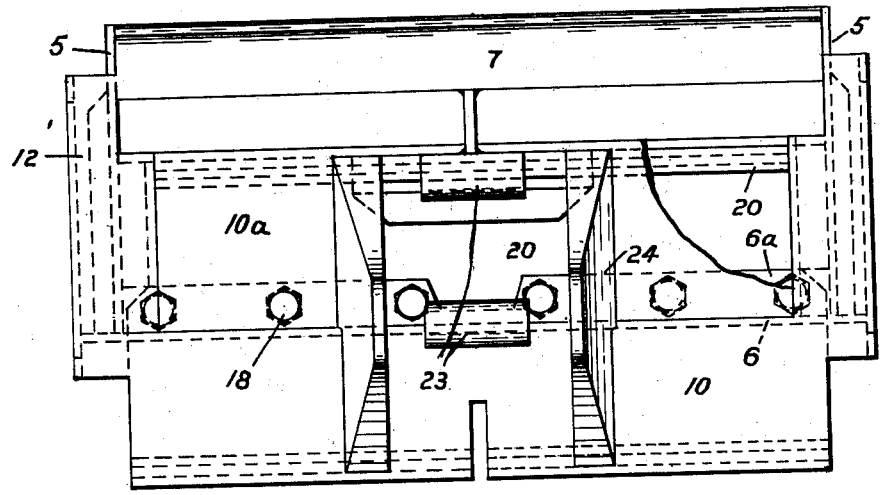
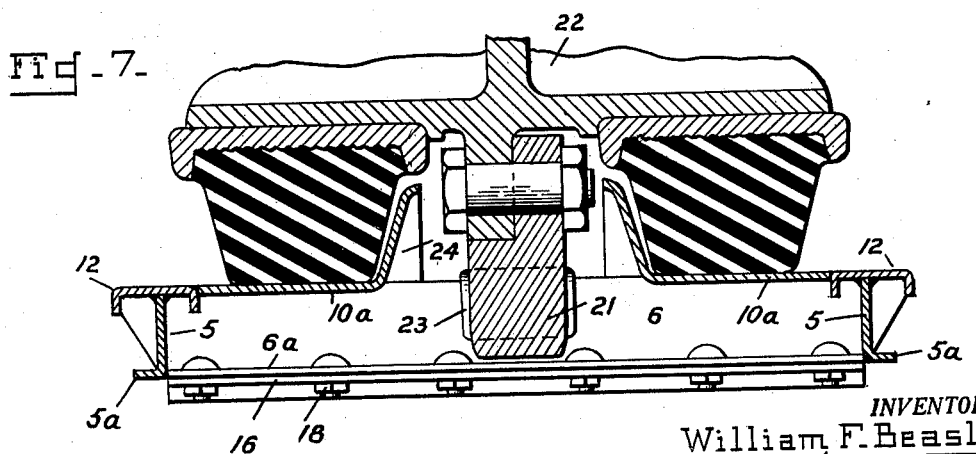
INVENTOR.
William F. Beasley
BY
ATTORNEY Patented May 22, 1934

1,959,337

UNITED STATES PATENT OFFICE 1,959,337

CHAIN

William F. Beasley, Columbus, Ohio

Application February 6, 1931, Serial No. 514,003

18 Claims. (Cl. 305—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a chain having special application as an endless track for vehicles and belonging to the type in which a resilient, non-metallic material such as rubber forms an element of the joint.

The invention is characterized by a novel link structure having dissimilar ends, one of which cooperates with a shoe to form a transverse casing extending the entire width of the link and confining the mated end of an adjoining link between resilient, non-metallic bearing members. The arrangement enables the entire link and shoe to be formed of light plate material appropriately flanged to provide strength while affording surfaces for engaging the ground and the wheels of the vehicle.

The construction of the links of sheet metal such as welded sheet steel or sheet aluminum results in an extremely large saving in weight thereby rendering possible substantial increases in speed for a given power plant.

The joint provides a large area for the resilient bearing members to reduce the unit pressure thereon, and the efficiency of the bearing members is increased by assembling the links in an intermediate position of flexure.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation and partly in section of a portion of a track consisting of the improved links;

Fig. 2 is an inside plan view of one of the links;

Fig. 3 is a view in end elevation of Fig. 2;

Fig. 4 is an enlarged sectional view through a joint showing the normal relationship of the parts when not in action;

Fig. 5 is a longitudinal sectional view of a link modified for a positive drive;

Fig. 6 is an inside plan view of the link of Fig. 5;

Fig. 7 is a transverse sectional view on the line 7—7 of Fig. 5.

Referring to Fig. 1, the track consists essentially of an articulated series of identical metal link members A, a shoe B at the joints of the link members and resilient bearing members C interposed between the metallic elements of the joint. While these bearing members are shown herein by way of illustration as extending the full width of the link it is to be understood that this structure is not essential to the invention as such bearing members may terminate short of the sides of the link or may consist of separate members spaced apart throughout the width or a portion of the width of the link.

As seen in Figs. 1 to 4, the links A are each in the form of a rectangular frame consisting of similar side plates 5—5 each having an outturned flange 5a at its bottom edge, an end plate 6 having a flange 6a turned in between the side plates, and an end plate 7, I-shaped in cross-section and assembled at an angle to the side plates, the angle being preferably one-half the angle of flexure in passing around the wheel 8. The frame is strengthened by a central plate 9 connecting the end plates and having opposite flanges 9a and 9b along its top and bottom edges.

A rail member forming the inside tread of the track for the wheel 8 consists of a relatively wide horizontally disposed plate 10 secured to the upper or inside marginal portion of the end plate 6 and projecting away from the link where it terminates in a rolled edge forming a groove 11. At the extremities of the rail member and preferably integral therewith are channeled arms 12—12 overlying and secured along a median line to the corresponding side plates 5. The end plate 6 extends to the outer edges of the arms to provide additional support at their shoulders. The rail and arms are arranged to respectively provide terminal recesses 13 and 14 on opposite sides of the side rail for the purpose of accommodating complementary parts when the links are connected in series.

All of the elements entering into the formation of the link are preferably secured by welding.

The shoe B is in the form of an angled plate complementary to the assembled end plate 6 and rail 10 so that it cooperates with these members in forming a transverse casing as clearly shown in Fig. 4. One edge of the shoe is formed with a lip 15 receivable in the groove 11 while the other edge 16 is formed to match the flange 6a and be secured thereto in any convenient manner by rivets 17 or bolts 18. Wearing strips B' may be deposited by welding to provide a surface more wear-resisting than the metal of which the shoe is composed.

When two links are connected the I-shaped end plate 7 is disposed in the transverse casing and spaced from the walls thereof by the resilient bearing members C which are preferably composed of rubber. The bearing members are fitted closely in the channels of the end plate 7 and beyond the limits of the end plate they are of greater height than the plate and held in compression by the rail 10 and the shoe B. The load of the vehicle on the rail 10 is transmitted directly to the shoe B and the end plate 7 is assured a full floating suspension normally out of contact with metal on all sides. The clearance between the end plate 7, the rail 10 and the shoe B is small to ensure a relatively smooth track for the tires 8 under conditions which may cause metallic contact between the end plate and its metallic enclosing parts.

The bearing members C normally maintain the end plate vertically in the casing and because of the inclination of the end plate with respect to the link, the adjoining links will assume an equivalent angularity which, as previously stated, is one-half the curvature or angle of flexure in passing around the wheel 8. In an endless track trained over wheels this neutral position of assembly is never present as some portion of the track will be trained about the wheels at a maximum curvature and the remaining portion will be without curvature due to the tension on the track and the weight of the vehicle transmitted through the customary supporting rollers when these are employed.

In action when the links are moved relatively to each other either to increase or decrease the angle of flexure the end plate is rotated within the transverse casing and the diametrically opposite edges compress the rubber bearing members. By virtue of the initial assembly of the links at one-half the angle of flexure the action of the joint is of limited degree and of equal and opposite value. As a consequence a bearing member of a given thickness will operate at maximum efficiency. Furthermore, by virtue of the structure and arrangement of the elements of the joint, a symmetrical formation is obtained in which the stresses are equally transmitted to the bearing members on opposite sides of the end plate and across the entire width of the bearing members. The area and volume of the rubber bearing members is sufficient to produce a low unit pressure and afford an efficient semi-elastic driving connection.

The weight of the vehicle is taken by the rigid transverse casing thereby reserving to the rubber bearing members the sole task of functioning as an element of the joint. Where the wheels 8 of the vehicle are of the dual type, a guide lug 19 may be conveniently secured to the rail 10.

The modified form of link shown in Figs. 5 to 7 is especially designed for a track that is to be used in connection with a positive drive. The links are essentially similar to the link of Figs. 1 to 4 but include in addition a transverse bar 20 connecting the side plates 5 and spaced from the end plate 7 a sufficient distance to accommodate the shoe B. The bar 20 is also spaced from the end plate 6 to provide a recess for receiving a tooth 21 of the sprocket wheel 22. The bar 20 and the end plate 6 carry wearing plates 23 presenting a rounded surface to the teeth 21. These wearing plates 23 are composed of some suitable wear-resisting material deposited by welding or cast pieces welded to the sheet metal parts which support them.

Auxiliary rail plates 10a are provided and are secured to the bar 20 and the end plate 6 to form a continuation of the rail member 10. The auxiliary plates are spaced to permit engagement of the sprocket teeth 21 with the link. Upright guide lugs 24, preferably integral with the auxiliary rail plates 10a and extending over the rail members 10 function as shown in Fig. 7 to prevent relative lateral movement of the track with respect to a dual wheel.

I claim:

1. A vehicle track chain embodying articulated link sections, each section consisting of spaced side and end plates connected to form a frame, one end plate being I-shaped in section and arranged at one-half of a predetermined angle of flexure, a rail plate secured at an angle to the inner edge of the other end plate and having channeled arms overlying the side plates, an angled shoe secured to the rail plate and one end plate and forming therewith a casing, an I-shaped end plate of an adjoining link placed in the casing and resilient bearing members on each side of said I-shaped end plate and confined by the casing.

2. A vehicle track chain embodying articulated link sections, each section consisting of spaced side and end plates connected to form a frame, one end plate being I-shaped in section, a rail plate secured at an angle to the inner edge of the other end plate and having channeled arms overlying the side plates, an angled shoe secured to the rail plate and one end plate and forming therewith a casing, an I-shaped end plate of an adjoining link placed in the casing and resilient bearing members on each side of said I-shaped end plate and confined by the casing.

3. A vehicle track chain embodying articulated link sections, each section consisting of spaced side and end plates connected to form a frame, one end plate being I-shaped in section, a rail plate secured at an angle to the inner edge of the other end plate and having arms overlying the side plates, a shoe secured to the rail plate and one end plate and forming therewith a casing, an I-shaped end plate of an adjoining link placed in the casing and resilient bearing members on each side of said I-shaped end plate and confined by the casing.

4. A vehicle track chain embodying a plurality of similar links, each comprising a rectangular frame, one end being I-shaped in section, and arranged at one-half of a predetermined angle of flexure, a shoe secured to the other end of the frame and cooperating therewith to form a casing, an I-shaped end of an adjoining link placed in the casing, and resilient bearing members on each side of the end plate and confined by the casing.

5. A vehicle track chain embodying a plurality of similar links, each comprising a rectangular frame, one end being I-shaped in section, a shoe secured to the other end of the frame and cooperating therewith to form a casing, an I-shaped end of an adjoining link placed in the casing, and resilient bearing members on each side of the I-shaped end and confined by the casing.

6. A vehicle track chain embodying, a plurality of similar links, each comprising a frame, a shoe secured to one end of the frame and cooperating therewith to form a casing, the mated end of an adjoining link placed in the casing, and resilient bearing members on each side of the mated end and confined by the casing.

7. A vehicle track chain embodying, a plurality of similar links, each comprising a frame, one end of the frame being inclined with respect to the plane of the frame, the other end of the frame comprising a transverse casing extending over the entire width thereof, an inclined end of an adjoining link placed in the casing, and resilient bearing members on each side of the inclined end and confined by the casing.

8. A vehicle track chain embodying, a plurality of similar links, each comprising a frame, one end of the frame being inclined with respect to the plane of the frame, the other end of the frame comprising a transverse casing, an inclined end of an adjoining link placed in the casing, and resilient bearing members on each side of the inclined end and confined by the casing.

9. A vehicle track chain embodying, a plurality of similar links, each comprising a frame, a transverse casing at one end of the frame, the mated end of an adjoining link positioned in the casing, and resilient bearing members on each side of the mated end and confined by the casing.

10. A link for vehicle track chains comprising a frame having dissimilar ends, a rail projecting from one end, a shoe secured to said rail and end and forming therewith a casing adapted to receive the complementary other end of a similar adjoining link.

11. A link for vehicle track chains comprising a frame, a transverse casing at one end extending the entire width of the frame, and an I-shaped member at the other end of the frame and inclined with respect to the plane of the frame an amount equal to one-half the value of a predetermined angle of flexure.

12. A link for vehicle track chains comprising a frame, a transverse casing at one end, and an I-shaped member at the other end of the frame and inclined with respect to the plane of the frame an amount equal to one-half the value of a predetermined angle of flexure.

13. A link for vehicle track chains comprising a frame, a transverse casing at one end extending the entire width of the frame, and an I-shaped member at the other end of the frame receivable in the transverse casing of an adjoining link.

14. A link for vehicle track chains comprising a rectangular frame formed of substantially vertical plates, a rail plate secured at an angle to the inner edge of one end plate of the frame and having channeled arms overlying the side plates of the frame, and an angled shoe secured to the rail and end plates and forming therewith a casing.

15. A link for vehicle track chains comprising a rectangular frame formed of substantially vertical plates, a rail plate secured at an angle to the inner edge of one end plate of the frame and having arms overlying the side plates of the frame, and a shoe secured to the rail and end plates and forming therewith a casing.

16. A link for vehicle track chains comprising a rectangular frame, a transverse bar connecting the sides of the frame and spaced from the ends of the frame, a pair of centrally spaced rail members supported on the bar and one end of the frame, and upstanding guide members integral with the inner sides of the rail members.

17. A link for vehicle track chains comprising a rectangular frame, a transverse bar connecting the sides of the frame and spaced from the ends of the frame, and a pair of centrally spaced rail members supported on the bar and one end of the frame.

18. A vehicle track chain embodying a plurality of similar links, each comprising a frame having a transverse casing at one end and a member at the opposite end inclined with respect to the plane of the frame, the inclined member of one link passing through the transverse casing of an adjoining link, and resilient bearing members on each side of the inclined member and confined by the casing, said members normally maintaining the inclined member parallel to the walls of the casing whereby adjoining links are normally at an angle to one another.

WILLIAM F. BEASLEY.